(12) United States Patent
Isami et al.

(10) Patent No.: US 9,116,376 B2
(45) Date of Patent: Aug. 25, 2015

(54) DISPLAY DEVICE

(71) Applicant: Japan Display Inc., Tokyo (JP)

(72) Inventors: Hironobu Isami, Chiba (JP); Shinji Shimizu, Atsugi (JP)

(73) Assignee: JAPAN DISPLAY INC., Tokyo (JP)

( * ) Notice: Subject to any disclaimer, the term of this patent is extended or adjusted under 35 U.S.C. 154(b) by 90 days.

(21) Appl. No.: 13/928,418

(22) Filed: Jun. 27, 2013

(65) Prior Publication Data

US 2014/0009717 A1 Jan. 9, 2014

(30) Foreign Application Priority Data

Jul. 3, 2012 (JP) .................................. 2012-149516

(51) Int. Cl.
*G02F 1/1333* (2006.01)

(52) U.S. Cl.
CPC ..................... *G02F 1/133308* (2013.01); *G02F 2001/133311* (2013.01); *G02F 2001/133317* (2013.01)

(58) Field of Classification Search
CPC .......... G02F 1/133308; G02F 1/13452; G02F 1/133; G02F 1/1333; G02F 1/13454; G02F 2001/133314; G02F 2001/133317; G02F 2001/13332; G02F 2001/133322; G02F 2001/133325; G02F 2201/46; G02F 2201/465

USPC .............. 349/58, 149, 187, 60, 151; 362/632, 362/225, 561, 633, 634, 97.1, 97.2, 190
See application file for complete search history.

(56) References Cited

U.S. PATENT DOCUMENTS

| | | | |
|---|---|---|---|
| 6,020,867 A * | 2/2000 | Shimada et al. ................. | 345/87 |
| 7,911,555 B2 * | 3/2011 | Fukayama et al. ............... | 349/58 |
| 2011/0234937 A1 * | 9/2011 | Han et al. ......................... | 349/58 |

FOREIGN PATENT DOCUMENTS

JP        2010-134168        6/2010

* cited by examiner

*Primary Examiner* — Thoi Duong
(74) *Attorney, Agent, or Firm* — Lowe Hauptman & Ham, LLP (57) ABSTRACT

A display device includes a display panel and a frame body that has a lower frame, a mold member, and an upper frame, wherein the upper frame has a box shape with one surface opened along a side wall surface and the other surface forming an opening part, the mold member includes a mounting part that mounts a peripheral part of the display panel and a catching part formed in correspondence with an end surface of the display panel, the catching part of the mold member includes a first catching part having a top part opposite to the mounting part in contact with an inner surface of the upper frame and a second catching part with a projection height from the mounting part lower than a projection height of the first catching part.

4 Claims, 9 Drawing Sheets

DISPLAY DEVICE

CROSS-REFERENCE TO RELATED APPLICATION

The present application claims priority from Japanese application JP2012-149516 filed on Jul. 3, 2012, the content of which is hereby incorporated by reference into this application.

BACKGROUND OF THE INVENTION

1. Field of the Invention

This invention relates to a display device, and specifically to a technology of improving reliability with respect to adhesion of droplets or the like from the front surface of a display panel.

2. Description of the Related Art

A liquid crystal display device of related art includes a lower frame that houses a backlight unit having a light source, a light guide plate, a diffuser plate, etc. and a mold member for positioning an optical sheet and a liquid crystal display panel placed in front of the light guide plate or the diffuser plate. Further, the device includes an upper frame being a picture frame shape whose opening part corresponding to a display area of the liquid crystal display panel formed therein, fitting in the lower frame, holding the liquid crystal display panel, and protecting its peripheral edge. On the other hand, polarizers are respectively provided on the front surface and the rear surface of the liquid crystal display panel, and the optical sheet such as an optical film (viewing angle improving film) for improvement of the viewing angle etc. is provided on the image display surface side of the liquid crystal display device, i.e., on the front surface of the liquid crystal display panel. The optical sheet etc. are held in the picture frame area of the upper frame.

Accordingly, there have been problems that, in the case where a liquid like water droplets etc. enters the inside of the liquid crystal display device, when the liquid attaches to the formation region of signal lines, display defects may occur because of the short circuit of the signal lines, or when the liquid enters the region between the backlight unit and the liquid crystal display panel, display defects of display irregularities or the like may occur.

As a method for solving the problems, for example, there is a thin display device described in JP 2010-134168 A, for example. In the thin display device described in JP 2010-134168 A, entry of a liquid like droplets etc. entering from an intake and exhaust port formed on the rear surface side is prevented.

SUMMARY OF THE INVENTION

In a liquid crystal display device of related art including a rotation mechanism used for medical application or the like, generally, the polarizer is provided foremost and, floating matter in the air in response to the usage environments and droplets (including airborne droplets) of beverages including soft drinks easily attach to the surface (exposed surface) of the polarizer provided foremost. Particularly, when droplets of a beverage or the like attach to the surface, part of them flows on the screen and enters the inside of the liquid crystal display device from the gap between the polarizer and the upper frame at the lower end side. Further, when the floating matter and the droplets attach to the surface, display quality becomes lower due to the reduction in display brightness because of the adhesion of the floating matter and the partial change in refractive index in a location where droplets of a beverage or the like fix. Accordingly, in related art, the floating matter is removed using a cleaner or the like, and the cleaner is generally made of a liquid solvent. On this account, in the case where a large amount of the cleaner is sprayed on the screen, like the case where droplets of a beverage attach to the screen, part of the sprayed cleaner flows on the screen and enters the inside of the liquid crystal display device from the gap between the polarizer and the upper frame at the lower end side.

On the other hand, in the liquid crystal display device for medical application requiring high-definition display, in the picture frame area as a marginal part of the liquid crystal display device, driver circuits for generating video signals and scan signals according to control signals are sometimes provided on three sides of the picture frame area. Accordingly, when the device has the rotation mechanism, it may be impossible to provide the side without the driver circuit on the lower end side of the display device. As a result, there has been a problem, when a liquid enters the picture frame area in the position in which the side with the driver circuit is at the lower end side of the device, adjacent signal lines or the like are short-circuited due to the entering liquid, and operation failures occur.

Particularly, in the liquid crystal display device of related art, foreign matter such as dust is prevented from entering between the diffuser plate and the liquid crystal display panel through the fitting part of the upper frame and the lower frame and through the gap between the upper frame and the mold member, and prevented from producing display irregularities in backlight beam. Specifically, the mold member formed along the inner peripheral surface of the lower frame holds the diffuser plate and the mold member and the upper frame hold the liquid crystal display panel. Accordingly, the mold member of related art is formed using a resin member being a picture frame shape in which an opening part for passing the backlight beam radiated from the diffuser plate is formed.

The mold member of related art has a mounting part formed to extend from the peripheral edge part in the in-plane direction of the mold member (liquid crystal display device). This extending part is formed in an annular shape along the peripheral edge part of the lower frame. Further, the mold member has a catching part which is annular shape and projects in the extension direction of the side wall surface of the lower frame, i.e., direction toward the upper frame along the outer peripheral edge part (outer edge part) of the annular mounting part. The inner peripheral surface of the catching part has a shape along the outer shape in the in-plane direction of the liquid crystal display panel mounted on the mounting part, and prevents shift in the planar direction of the liquid crystal display panel placed between the mounting part of the mold member and the picture frame part of the upper frame and prevents entry of foreign matter such as dust from the gap between the upper frame and the lower frame.

On the other hand, in the case where the amount of droplets attached to the front surface of the liquid crystal display panel is large, the attached droplets flow on the screen and reach the picture frame part of the upper frame and enters the inside from the gap between the picture frame part and the liquid crystal display panel. As a result, the liquid entering from the gap between the upper frame and the liquid crystal display panel is held in a space formed by the driver circuit, the picture frame part of the upper frame, and the catching part of the mold member. Particularly, the inventors of the application have found that, in the case where the entering liquid contains various additives of a soft drink or the like, only the additives are left after the liquid is dried off, and the signal lines from the driver circuits are short-circuited by the remaining additives and display defects occurs.

The invention has been achieved in view of the problems, and a purpose of the invention is to provide a display device that can reduce operation failures due to a liquid entering the inside of the device from the screen surface.

In order to solve the problems, a display device of the invention includes a display panel that performs image display, and a frame body that has a lower frame, a mold member, and an upper frame and that protects to cover the display panel, wherein the upper frame has a box shape with one surface opened along a side wall surface and the other surface extending from a proximity of the side wall in an in-plane direction by a predetermined amount to form an opening part corresponding to a display area, the mold member is formed integrally with or separately from the lower frame member and includes a mounting part that mounts at least a peripheral part of the display panel and supports the display panel from a rear surface side, and a catching part formed along a side surface of the display panel to project from the mounting part in the mounting direction of the display panel and formed in correspondence with an end surface of the display panel, the catching part of the mold member includes a first catching part having a top part opposite to the mounting part in contact with an inner surface of the upper frame, and a second catching part with a projection height from the mounting part lower than a projection height of the first catching part, and the second catching part is formed at a lower part side of an image displayed on the display panel.

According to the invention, operation failures due to the liquid entering the inside of the device from the screen surface may be reduced.

Other advantages of the invention will be made clear from the description of the entire specification.

DETAILED DESCRIPTION OF THE INVENTION

As below, embodiments to which the invention is applied will be explained using the drawings. Note that, in the following explanation, the same component elements have the same signs and the repeated explanation will be omitted. Further, X, Y, Z in the drawings show an X-axis, a Y-axis, and a Z-axis, respectively.

First Embodiment

Figure 1:
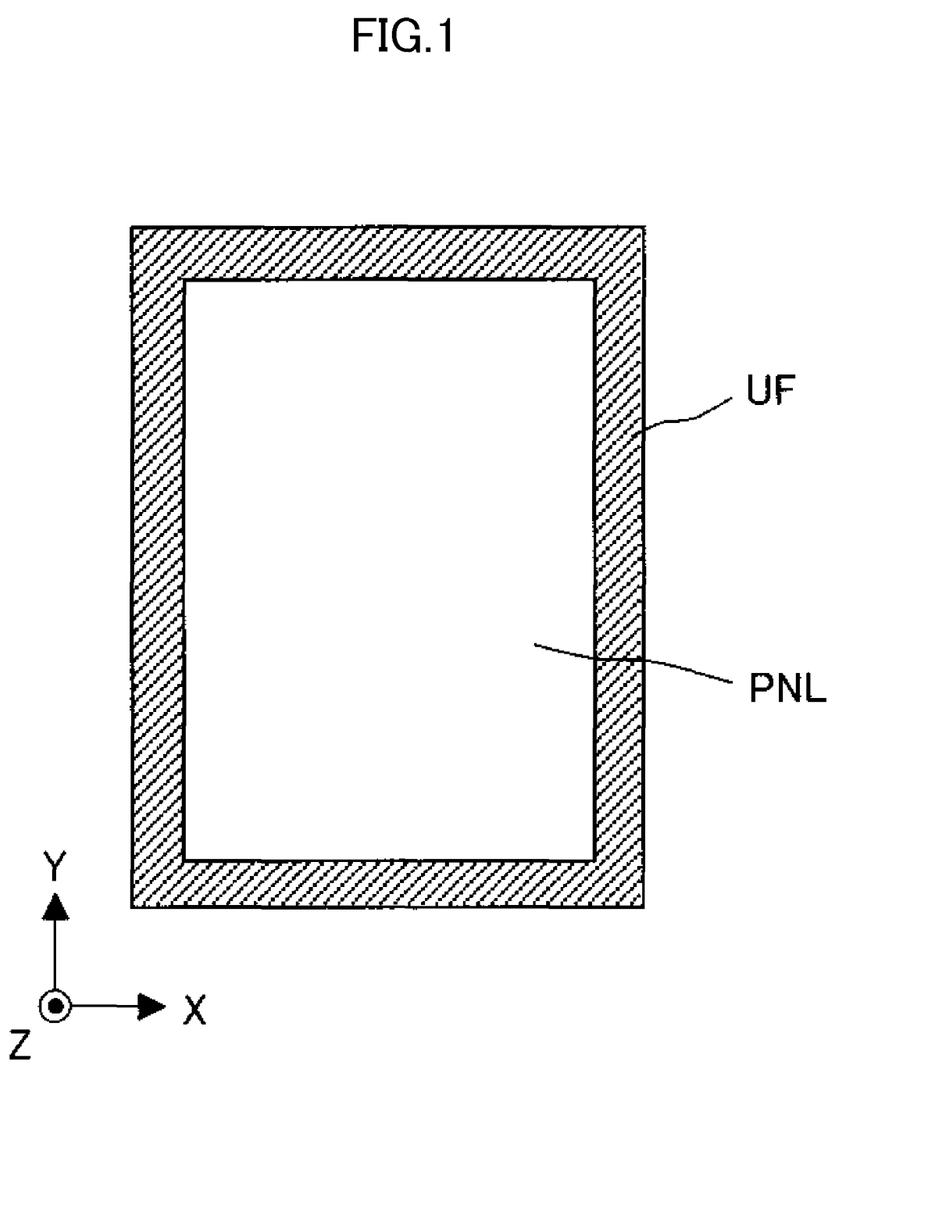
FIG. 1 is a plan view for explanation of an overall configuration of a liquid crystal display device as a display device of embodiment 1 of the invention.
Figure 2:
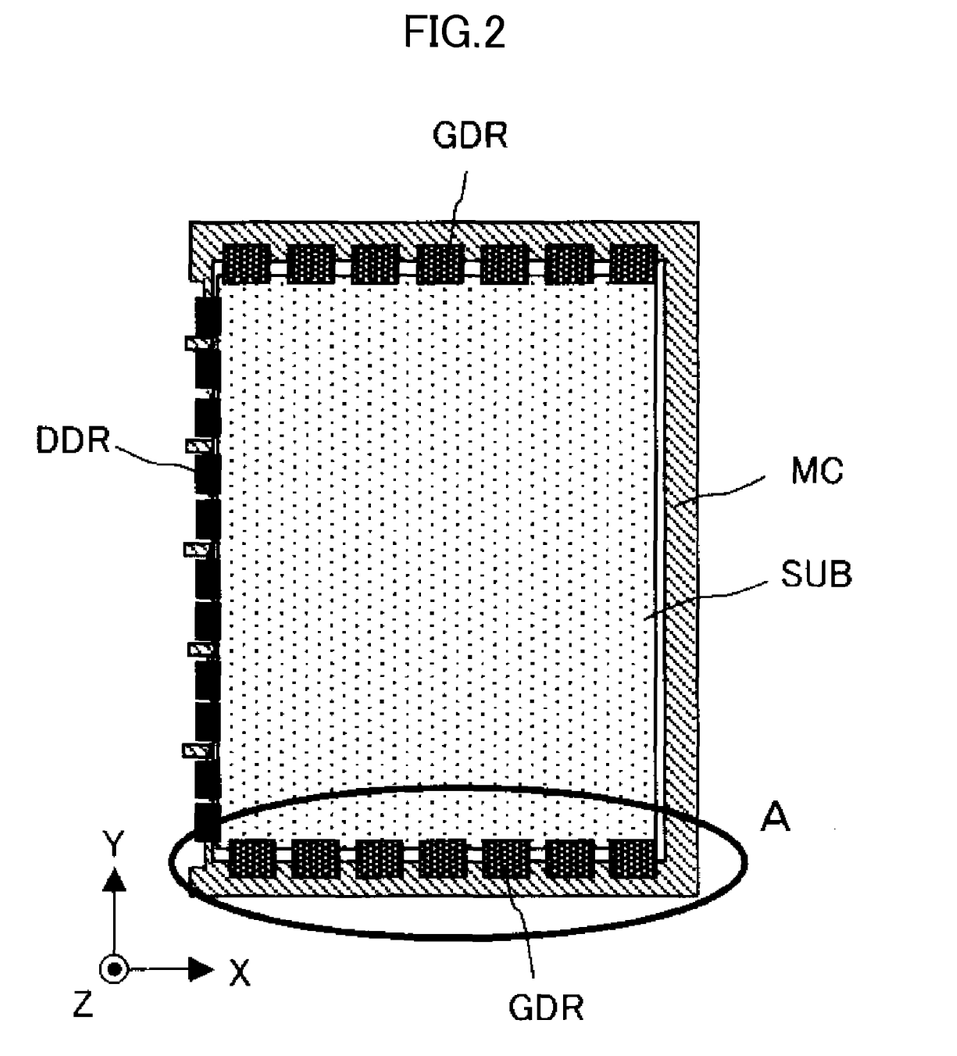
FIG. 2 is a plan view for explanation of an arrangement configuration of a liquid crystal display panel in the liquid crystal display device as the display device of embodiment 1 of the invention.

FIG. 1 is a plan view for explanation of an overall configuration of a liquid crystal display device as a display device of embodiment 1 of the invention, FIG. 2 is a plan view for explanation of an arrangement configuration of a liquid crystal display panel in the liquid crystal display device as the display device of embodiment 1 of the invention, and the overall configuration of the display device of embodiment 1 will be explained as below with reference to FIGS. 1 and 2. Note that, in the following explanation, the case where the invention of the application is applied to a liquid crystal display device will be explained, however, the invention of the application is not limited to a liquid crystal display device as a non-emissive display device. For example, the invention may be applied to a flat-plate display device using self-emitting elements such as LED (light emitting diodes) and EL (Electro Luminescence).

The display device of embodiment 1 is a liquid crystal display device including a backlight unit that radiates planar light and a liquid crystal display panel that performs image display by controlling an amount of transmission of the planar light, and a mold member MC formed using a resin material and having a shape along the outer periphery in a lower frame (not shown) as shown in FIG. 2. The mold member MC of embodiment 1 is provided at an opening surface side of the lower frame (not shown), has a shape along a side wall surface, and thereby, is formed along the peripheral edge part of the liquid crystal display panel PNL.

Specifically, in the liquid crystal display device of embodiment 1, scan signal line driver circuits (gate drivers) GDR that generate scan signals are provided on two sides opposed in the Y-direction of the liquid crystal display panel PNL, i.e., on two sides at the upper and lower shorter sides in the drawing, and video signal line driver circuits (drain drivers) DDR are provided in one side part of the two sides opposed in the X-direction, i.e., in the side part at the left longer side in the drawing. The scan signal line driver circuits GDR are known driver circuits that generate scan signals from control signals input from the outside and output the scan signals to scan signal lines (not shown) extending in the Y-direction and arranged in the X-direction of the liquid crystal display panel PNL. Further, the video signal line driver circuits DDR are known driver circuits that generate video signals from control signals input from the outside and output the video signals to video signal lines (not shown) extending in the X-direction and arranged in the Y-direction of the liquid crystal display panel PNL.

Further, in the liquid crystal display panel PNL of embodiment 1, the scan signal line driver circuits GDR and the video signal line driver circuits DDR are placed to partially project from end parts of a pair of transparent substrates oppositely provided via a liquid crystal layer (not shown) to the outside. Furthermore, in the liquid crystal display panel PNL of embodiment 1, catching parts (not shown) projecting toward the upper surface of the mold member MC, i.e., the side on which the liquid crystal display panel PNL is mounted are formed on four sides of the liquid crystal display panel PNL formed in a rectangular shape.

In addition, in the liquid crystal display panel PNL of embodiment 1, as shown in FIG. 1, the liquid crystal display panel PNL is sandwiched between the mold member MC and an upper frame UF provided at the front (display) side of the liquid crystal display device. In this regard, the upper frame UF has a box shape and an area having a picture frame shape of about 1 to 2 cm (the shaded area in FIG. 1) with one surface opened along a side wall surface (not shown) and the other surface extending from the proximity of the side wall in the in-plane direction by a predetermined amount is formed. According to the configuration, the opening part corresponding to a display area (not shown) of the liquid crystal display panel PNL is formed, and a display image is output via the opening part. Further, the upper frame UF and the lower frame are fitted to form a frame body via the liquid crystal display panel PNL mounted on the mold member, and thereby, protect the liquid crystal display panel PNL formed using glass substrates, for example, as the pair of transparent substrates. Note that the transparent substrates are not limited to glass substrates, but may be other transparent substrates using a resin, for example.

Figure 3:
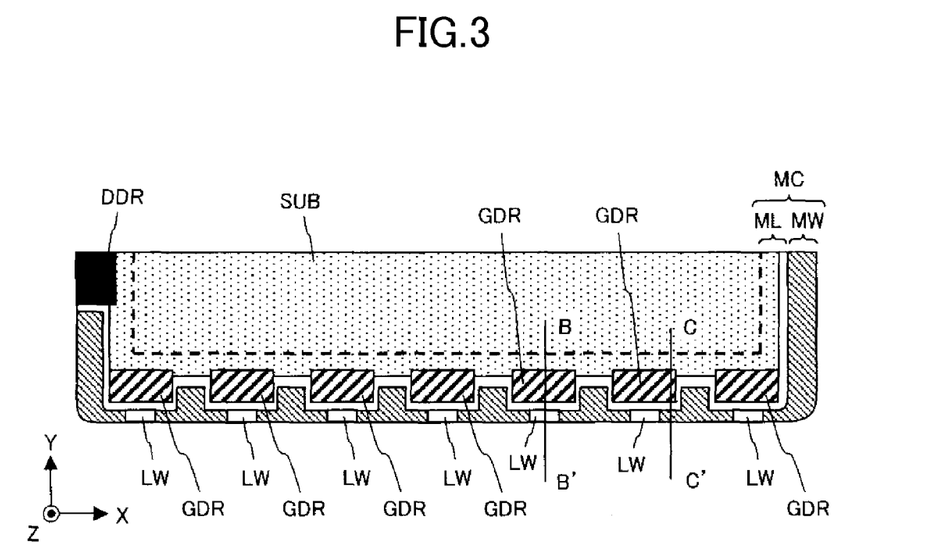
FIG. 3 is an enlarged view of a lower end part of the liquid crystal display device as the display device of embodiment 1 of the invention.

Next, FIG. 3 shows an enlarged view of a lower end part of the liquid crystal display device as the display device of embodiment 1 of the invention, and the detailed configuration of the mold member MC of embodiment 1 will be explained as below. Note that, in the mold member MC of embodiment 1 shown in FIG. 3, for clarification of the difference between the mold member of related art and the mold member MC of embodiment 1, of the formation region of the mold member MC, only the part in contact with the picture frame part of the upper frame UF is shaded and the other region is shown in white.

As shown in FIG. 3, regarding the liquid crystal display panel PNL of embodiment 1, the scan signal line driver circuits GDR and the video signal line driver circuits DDR are mounted to project from the marginal parts of the pair of glass substrates SUB oppositely provided via a liquid crystal layer (not shown) to form the liquid crystal display panel PNL. As a result, in the liquid crystal display panel PNL of embodiment 1, the marginal parts on which the scan signal line driver circuits GDR and the video signal line driver circuits DDR are mounted have shapes with concavities and convexities corresponding to the respective driver circuits GDR, DDR. On the other hand, in the side part on which the scan signal line driver circuits GDR and the video signal line driver circuits DDR are not mounted, i.e., the side part at the right side in the drawing, the marginal parts of the liquid crystal display panel PNL of embodiment 1 have linear shapes. Note that, in the liquid crystal display panel PNL of embodiment 1, the scan signal line driver circuits GDR and the video signal line driver circuits DDR are mounted to project from the marginal parts of the pair of glass substrates SUB, and thereby, the distance from the fitted parts to the marginal parts of the glass substrates SUB when the upper frame UF and the lower frame (not shown) are fitted to form the frame body is formed to be larger for preventing foreign matter such as dust from entering inside.

Further, the outer peripheral shape of the mold member MC is formed to be larger than the outer peripheral shape of the liquid crystal display panel PNL in the in-plane direction as seen from the upper surface side, i.e., the image display side, and an opening part for planar light from the backlight unit (not shown) provided on the rear surface of the liquid crystal display panel PNL to pass is formed in the in-plane direction of the mold member MC. That is, like the mold member of related art, the mold member MC of embodiment 1 also has an annular (picture frame) mounting part ML projecting in the inner periphery direction, and the liquid crystal display panel PNL is mounted on the mounting part ML. The part with dots in FIG. 3 shows the peripheral edge part at the inner periphery side of the mounting part ML.

Furthermore, the mold member MC of embodiment 1 has a catching part MW formed to project toward the mounting surface side of the liquid crystal display panel PNL in the Z-direction, and formed in a wall shape along the outer peripheral surface of the mold member MC. In this regard, as described above, the peripheral edge part of the liquid crystal display panel PNL has convexities and concavities for mounting of the scan signal line driver circuits GDR and the video signal line driver circuits DDR, and thus, pocket-shaped recess parts corresponding to the scan signal line driver circuits GDR and the video signal line driver circuits DDR are formed on the inner periphery surface of the catching part MW of embodiment 1. That is, as shown in FIG. 3, in the configuration of the mold member MC of embodiment 1, the thickness of the catching part MW in the regions in which the scan signal line driver circuits GDR are provided is formed to be thinner and the end parts at the outer periphery side of the scan signal line driver circuits GDR are located closer to the inner wall surface of the catching part MW. On the other hand, the thickness of the catching part MW in the regions in which the scan signal line driver circuits GDR are not provided is formed to be thicker and the end parts of the glass substrates SUB forming the liquid crystal display panel PNL are located closer to the inner wall surface of the catching part MW. According to the configuration, in the mold member MC of embodiment 1, the recess parts corresponding to the respective scan signal line driver circuits GDR are formed.

In this regard, in the mold member MC of embodiment 1, regions in which the catching part MW is not formed (cutout parts) LW are formed with respect to each recess part of the catching part MW formed in correspondence with the scan signal line driver circuits GDR. In the configuration of the catching part MW of embodiment 1, the cutout parts LW are formed in the center parts of the respective recess parts.

Figure 4A:
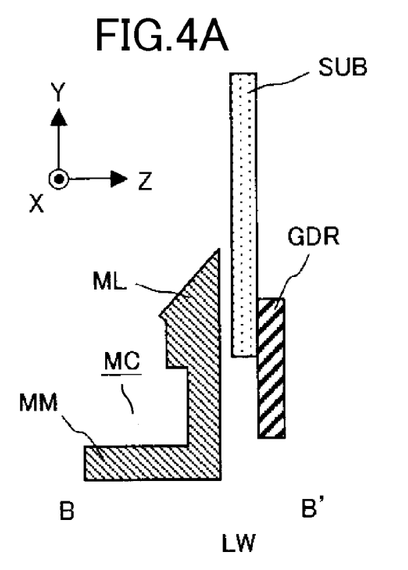
FIGS. 4A to 4D are sectional views along B-B' line shown in FIG. 3.
Figure 4B:
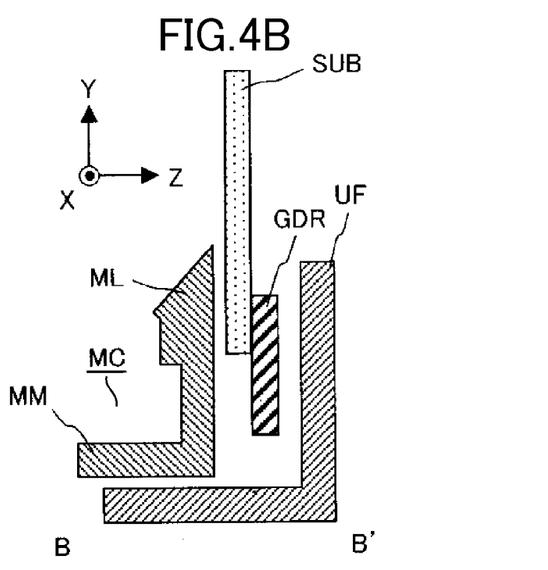
Figure 4C:
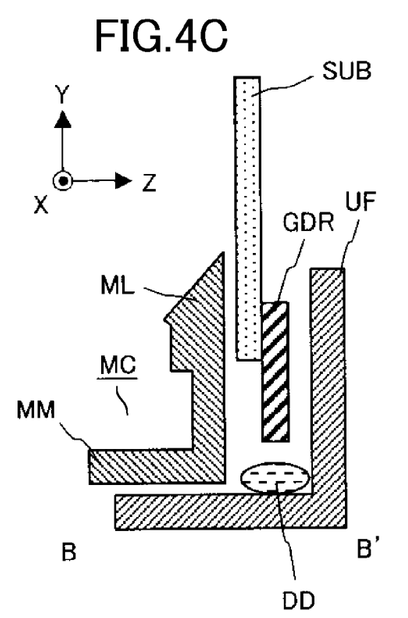
Figure 4D:
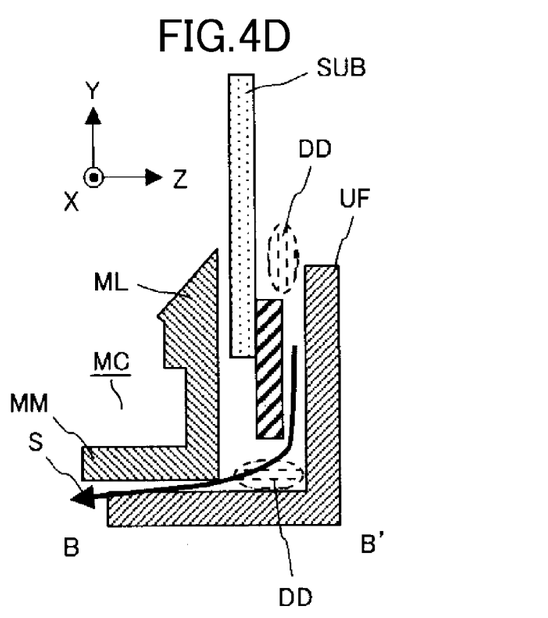
Figure 5A:
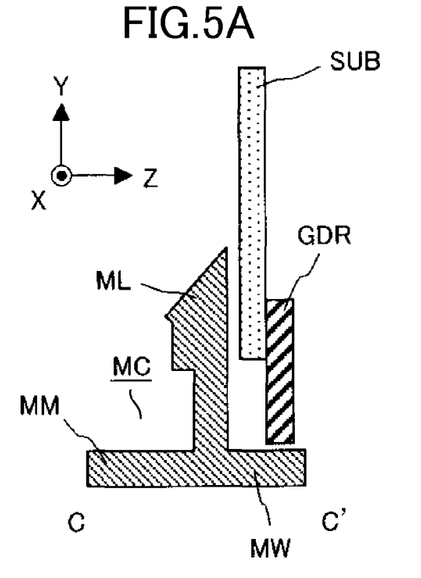
FIGS. 5A to 5C are sectional views along C-C' line shown in FIG. 3.
Figure 5B:
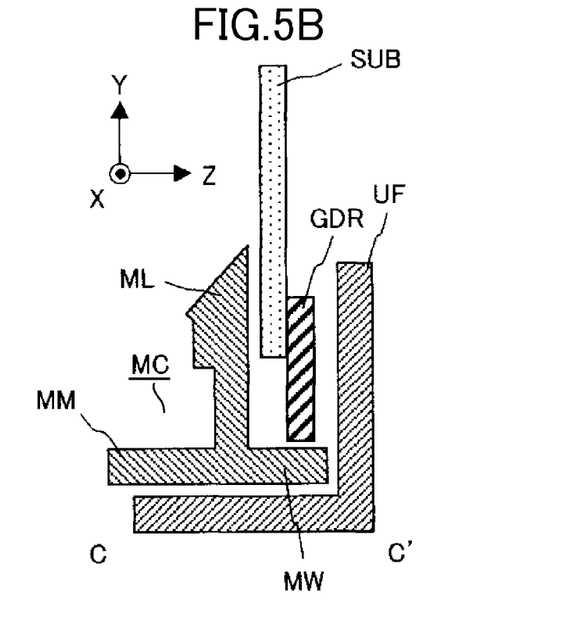
Figure 5C:
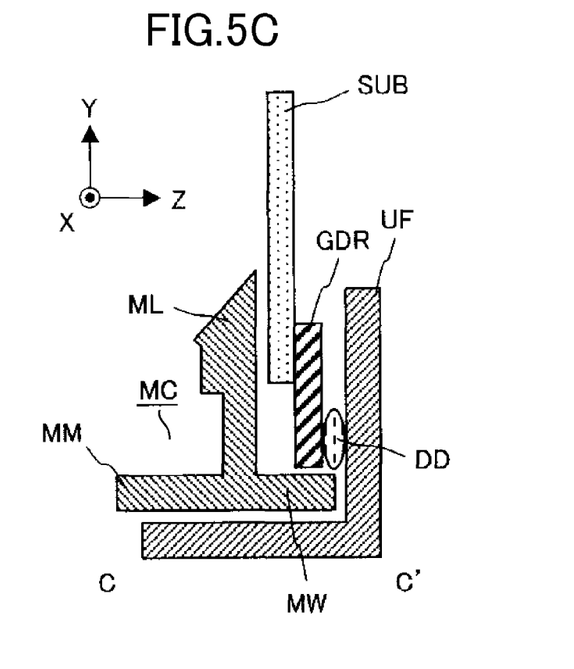

Next, FIGS. 4A to 4D show sectional views along B-B' line shown in FIG. 3 and FIGS. 5A to 5C are sectional views along C-C' line shown in FIG. 3, and the detailed configuration of the catching part MW of embodiment 1 will be explained with reference to FIGS. 4A to 5C. Note that FIGS. 4A and 5A show the sectional views when the upper frame UF is not provided, FIGS. 4B and 5B show the sectional views when the upper frame UF is provided, FIGS. 4C and 5C show the sectional views when the upper frame UF is provided and a liquid enters, and FIG. 4D shows the sectional view when the upper frame UF is provided for explanation of a drainage path of the entering liquid. Further, the sectional views shown in FIGS. 4A to 5C are the sectional views at the lower side of the display image in the image display mode in the liquid crystal display device of embodiment 1 or the like.

As shown in FIG. 4A, the mold member MC of embodiment 1 has an insertion part MM inserted into the lower frame (not shown) and integrated with the lower frame, and the mounting part ML is formed orthogonally to the insertion part MM. In the mold member MC of embodiment 1, the catching part MW formed to extend from the insertion part MM is not formed in the cutout part LW, and the catching part MW is not formed in the lower end parts in FIG. 4A of the glass substrate SUB and the scan signal line driver circuit GDR.

As a result, as shown in FIG. 4B, when the upper frame UF is provided, the side wall part of the upper frame UF is located at the lower end side of the liquid crystal display panel PNL, i.e., at the lower end side of the scan signal line driver circuit GDR. That is, in the region in which the cutout part LW is formed, when the liquid crystal display device is stood for use, the liquid crystal display panel PNL is caught by the convex part of the catching part MW adjacent to the cutout part LW, and a space is formed from the lower end of the liquid crystal display panel PNL in the drawing to the side wall of the upper frame UF.

According to the configuration, even when a liquid (droplets) DD enters from between the liquid crystal display panel PNL and the picture frame part of the upper frame UF, the entering liquid DD rapidly moves via the region between the glass substrate SUB and the scan signal line driver circuit GDR and the picture frame part of the upper frame UF to the lower end part. That is, the liquid DD entering the liquid crystal display device moves to the picture frame part of the upper frame UF below the liquid crystal display panel PNL as shown in FIG. 4C. Therefore, even when the liquid DD is a beverage containing various additives such as a soft drink, the liquid is evaporated in the picture frame part of the upper frame UF, and the additives of the beverage are deposited in the picture frame part of the upper frame UF. That is, the additives are not deposited in the parts in contact with the glass substrate SUB and the scan signal line driver circuit GDR, and thereby, short circuit or the like of signal lines or the like causing display defects may be prevented.

In the case of the liquid DD with smaller amounts of additives and lower viscosity, even when the liquid DD enters from between the liquid crystal display panel PNL and the picture frame part of the upper frame UF, the entering liquid DD is easily ejected to the outside as indicated by an arrow S as shown in FIG. 4D. That is, the liquid DD entering from the region between the glass substrate SUB and the picture frame part of the upper frame UF is ejected to the outside via the region between the scan signal line driver circuit GDR and the picture frame part of the upper frame UF and the gap region (gap part) between the insertion part MM of the mold member MC and the side wall part of the lower frame (not shown) and the side wall part of the upper frame UF. Therefore, even when the amount of the entering liquid DD is larger, short circuit or the like of signal lines or the like causing display defects may be prevented.

On the other hand, in the region in which the cutout part LW is not formed in the mold member MC of embodiment 1, as shown in FIG. 5A, the catching part MW is formed to project in the Z-direction (toward the right side in the drawing) in the lower end in the drawing of the liquid crystal display panel PNL. Therefore, even when the liquid crystal display device of embodiment 1 is stood, the convex catching part (not shown) of the catching part MW is in contact with the liquid crystal display panel PNL, and the liquid crystal display panel PNL may be prevented from moving in the in-plane direction, i.e., in the Y-direction (toward the lower side in the drawing).

When the upper frame UF is provided, as shown in FIG. 5B, the distance between the picture frame part of the upper frame UF and the end part of the catching part MW is very small like that in related art. Particularly, to ensure the catching of the liquid crystal display panel PNL by the catching part MW, the distance between the catching part MW and the picture frame part of the upper frame UF is formed to be smaller than the size of the scan signal line driver circuit GDR in the Z-direction, i.e., the thickness. As a result, when the liquid DD enters from between the glass substrate SUB and the picture frame part of the upper frame UF, the entering liquid DD moves to the region formed by the scan signal line driver circuit GDR, the picture frame part of the upper frame UF, and the catching part MW as shown in FIG. 5C. That is, the entering liquid DD moves to the location in contact with the scan signal line driver circuit GDR, the picture frame part of the upper frame UF, and the catching part MW.

In this regard, in the configuration of the mold member MC of embodiment 1, as clearly seen from FIG. 3, the formation location of the cutout part LW formed in the catching part MW is formed nearly in the center part with respect to the width in the X-direction of each scan signal line driver circuit GDR. Therefore, the width of the catching part MW in the X-direction corresponding to the scan signal line driver circuit GDR is formed to be the smaller width, and thus, the liquid DD that has moved to the region formed by the scan signal line driver circuit GDR, the picture frame part of the upper frame UF, and the catching part MW shown in FIG. 5C may easily move to the cutout part LW. Here, the liquid DD that has moved to the cutout part LW stays in contact with the picture frame part of the upper frame UF or is ejected to the outside via the gap region between the side wall part of the upper frame UF and the insertion part MM of the mold member MC as described above. As a result, the additives are not deposited in the parts in contact with the glass substrate SUB and the scan signal line driver circuit GDR, and thus, short circuit or the like of signal lines or the like causing display defects may be prevented, and, even when the amount of the entering liquid DD is larger, short circuit or the like of signal lines or the like causing display defects may be prevented.

As explained above, in the liquid crystal display device of embodiment 1, the mold member MC (including the lower frame) provided on the rear surface side of the liquid crystal display panel PNL and the upper frame UF provided on the front surface side form the frame body supporting the liquid crystal display panel PNL. In this regard, the upper frame UF has a box shape with one surface opened along the side wall surface and the other surface extending from the proximity of the side wall in the in-plane direction by a predetermined amount to form an opening part corresponding to the display area. Further, the mold member MC is formed by integrally or separately combined with the lower frame and has the mounting part ML as a part that mounts at least the peripheral part of the liquid crystal display panel PNL and supports the liquid crystal display panel PNL from the rear surface side, and the catching part formed along the peripheral side surface of the liquid crystal display panel PNL to project from the mounting part ML in the mounting direction of the liquid crystal display panel PNL, i.e., the arrangement direction of the upper frame UF and formed in contact with the end surface of the liquid crystal display panel PNL to prevent movement of the liquid crystal display panel PNL in the in-plane direction. In this regard, in the liquid crystal display device of embodiment 1, the catching part MW of the mold member MC is formed by a first catching part formed to have a top part with the projection height in contact with the inner surface of the upper frame UF and a second catching part with the projection height from the mounting part lower than the projection height of the first catching part. A plurality of the second catching parts are formed on one side. That is, a plurality of the cutout parts LW formed in the catching part MW are formed on one side and the cutout parts LW are formed in the side part at the lower end side when the liquid crystal display device is stood. As a result, even when a liquid enters from the gap between the liquid crystal display panel PNL and the upper frame in the stood condition, the entering liquid may move to the inner wall surface of the side wall part of the upper frame via the liquid crystal display panel PNL and the driver circuits, and thus, short circuit or the like of signal lines caused by the entering liquid may be prevented.

That is, in the liquid crystal display device of embodiment 1, the end part of the catching part MW formed in the mold member MC has the step in the Z-direction as the projection direction, and a step is formed with respect to each catching part MW of the part corresponding to the scan signal line driver circuit GDR. As a result, in the liquid crystal display device of embodiment 1, even when a liquid enters from the gap between the liquid crystal display panel PNL and the upper frame in the stood condition, the entering liquid moves to the inner wall surface of the side wall part of the upper frame via the liquid crystal display panel PNL and the driver circuits by the formed steps, and thus, short circuit or the like of signal lines caused by the entering liquid may be prevented.

Embodiment 2

Figure 6A:
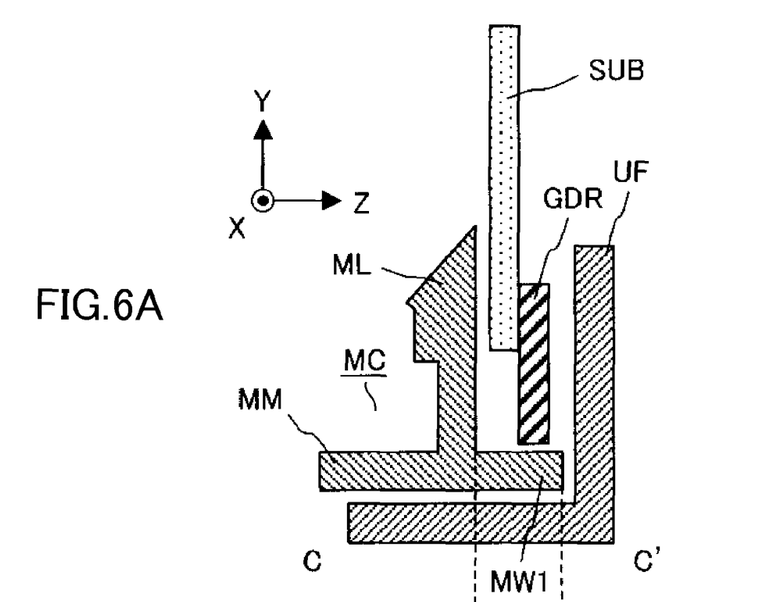
FIGS. 6A and 6B are diagrams for explanation of a schematic configuration of a liquid crystal display device as the display device of embodiment 2 of the invention.
Figure 6B:
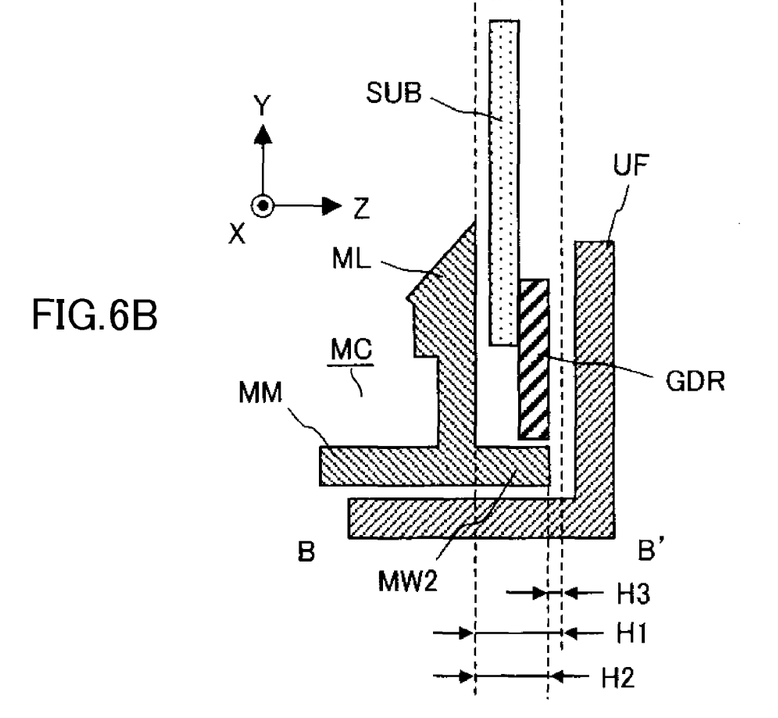

FIGS. 6A and 6B are diagrams for explanation of a schematic configuration of a liquid crystal display device as the display device of embodiment 2 of the invention, and specifically, FIG. 6A corresponds to FIG. 5B of embodiment 1 and FIG. 6B corresponds to FIG. 4B of embodiment 1. Note that, in the configuration of embodiment 2, the other configuration than the configuration of the catching part MW is the same as that of embodiment 1, and the configuration of the catching part MW will be explained in detail in the following explanation.

As shown in FIGS. 6A and 6B, in the mold member MC of embodiment 2, in the region in which the cutout part LW is formed, like the part in which the cutout part LW is not formed, the catching part MW is formed from the surface of the mounting part ML in the Z-direction in which the picture frame part of the upper frame UF is provided (toward the image display side). That is, in the mold member MC of embodiment 2, the catching part MW in the region in which the cutout part LW is not formed (hereinafter, referred to as "first catching part MW1") and the catching part MW in the region in which the cutout part LW is formed (hereinafter, referred to as "second catching part MW2") form the catching part MW of embodiment 2.

Here, suppose that the amount of projection from the surface of the mounting part ML in the Z-direction in the first catching part MW1 is a height H1 of the first catching part MW1 and the amount of projection from the surface of the mounting part ML in the Z-direction in the second catching part MW2 is a height H2 of the second catching part MW2. In this case, in the configuration of embodiment 2, the height H2 of the second catching part MW2 is lower than the height H1 of the first catching part MW1, and, suppose that the difference between the height H1 of the first catching part MW1 and the height H2 of the second catching part MW2 is H3, H3=H1−H2 and the range of H3 is H1≥H3≥0.1 (mm). In response, the range of the height H2 is H1−0.1 (mm)≥H2≥0 (zero). That is, it is preferable that the depth of the cutout part LW (gap) is at least 0.1 (mm). Note that H1≥H3 in the configuration of embodiment 2, however, the configuration of embodiment 1 is obtained in the case where H3=H1 (H2=0 (zero)). Further, in the invention of the application, in view of the configuration for securing the drainage path, depending on the shape of the mold member MC of embodiment 2, the recess part may be formed in the region in which the second catching part MW2 is formed, i.e., in the region in which the cutout part LW is formed and the depth of the cutout part LW may be larger than the surface of the mounting part ML.

According to the configuration, in the configuration of mold member MC of embodiment 2, the difference H3 between the height H1 and the height H2 corresponding to the depth of the cutout part LW is formed in the range H1≥H3≥0.1 (mm), and a sufficient gap for the entering liquid to move to the side wall part of the upper frame UF is secured. Note that the optimum value of the difference H3 between the height H1 of the first catching part MW1 and the height H2 of the second catching part MW2 largely varies depending on the surface tension of the liquid entering inside or the like, and it is preferable to appropriately select the value in the range H1≥H3≥0.1 (mm) based on an experiment or the like.

However, as clearly seen from FIGS. 6A and 6B, in the configuration of embodiment 2, in order not to bring the liquid moving to the inner side surface of the side wall part of the upper frame UF into contact with the scan signal line driver circuit GDR, the volume is determined depending on the width of the cutout part LW in the X-direction, the thickness of the second catching part MW2 in the Y-direction, and the distance from the inner peripheral surface of the picture frame part of the upper frame UF to the top part of the second catching part MW2. On the other hand, due to the increasing demand for the smaller picture frame and the thinner shape of recent liquid crystal display devices, it is difficult to make the thickness of the second catching part MW2 in the Y-direction larger. Therefore, in the configuration of embodiment 2, it is preferable to secure the volume for holding the entering liquid by appropriately selecting the width of the cutout part LW in the X-direction and the distance from the inner peripheral surface of the picture frame part of the upper frame UF to the top part of the second catching part MW2. In this regard, in the configuration of embodiment 2, for example, suppose that the total thickness of the thickness of the glass substrate SUB in the Z-direction and the thickness of the scan signal line driver circuit GDR in the Z-direction (hereinafter, referred to as "thickness of liquid crystal display panel PNL") is H4, it is preferable that the height H2 of the second catching part MW2 is smaller than the thickness H4 of the liquid crystal display panel PNL. This is because, according to the configuration, it becomes easier for the liquid that has moved to the lower part of the scan signal line driver circuit GDR in the drawing to further move to the top of the second catching part MW2, and then, move to the side wall part of the upper frame UF.

As described above, in the liquid crystal display device of embodiment 2, the catching part MW is formed by the first catching part MW1 having the height H1 and the second catching part MW2 having the smaller height H2, and thus, the region corresponding to the cutout part LW may be formed between the top part of the second catching part MW2 and the picture frame part of the upper frame UF and the same advantage as that of the first embodiment may be obtained.

Embodiment 3

Figure 7:
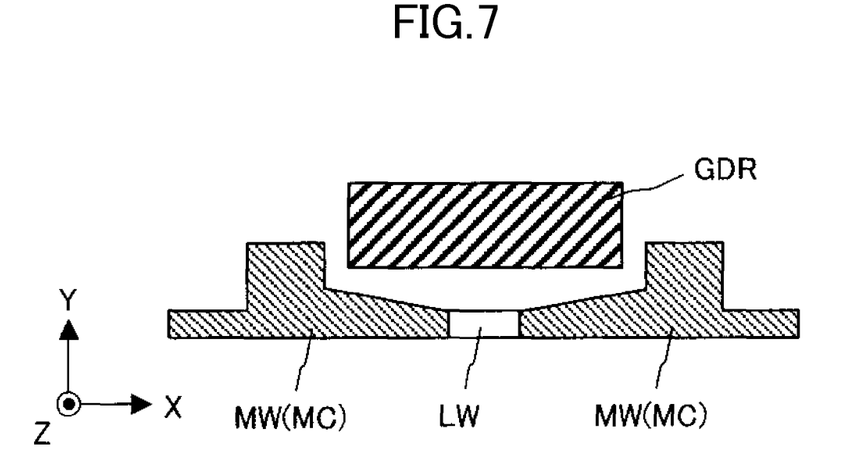
FIG. 7 is a plan view for explanation of a schematic configuration of a mold member in a liquid crystal display device of embodiment 3 of the invention.

FIG. 7 is a plan view for explanation of a schematic configuration of a mold member in a liquid crystal display device of embodiment 3 of the invention, and specifically, an enlarged view of a catching part MW corresponding to one scan signal line driver circuit GDR. Note that, in the liquid crystal display device of embodiment 3, the other configuration than the shape of the inner peripheral surface of the catching part MW is the same as that of embodiment 1. Accordingly, in the following explanation, the shape of the inner peripheral surface of the catching part MW corresponding to one scan signal line driver circuit GDR will be explained in detail. Further, in embodiment 3, the case where the catching part MW of embodiment 3 is applied to the catching part MW of embodiment 1 will be explained, however, it may be applied to the catching part MW of embodiment 2, i.e., the shape of the inner peripheral surface of the first catching part MW1.

As shown in FIG. 7, also in the catching part MW of embodiment 3, a cutout part LW is formed in the part at the lower end side when an image is displayed. In the catching part MW of embodiment 3, the inner peripheral surface, i.e., the surface in contact with the scan signal line driver circuit GDR is tapered with respect to the formation location of the cutout part LW and the inclination is directed toward the cutout part LW. Particularly, in the catching part MW of embodiment 3, the cutout part LW corresponding to each scan signal line driver circuit GDR is formed in a location nearly at the center with respect to the width of the scan signal line driver circuit GDR in the X-direction. Further, the size of the catching part MW in the Y-direction in the part in which the cutout part LW is formed (the thickness of the catching part MW) is the minimum and the thickness of the catching part MW becomes larger as it is farther from the cutout part LW.

In addition, in the liquid crystal display device of embodiment 3, it is easy for the liquid (not shown) entering in the part in which the cutout part LW is not formed to reach the catching part MW, and then, move to the cutout part LW along the tapered inclination formed on the inner wall surface of the catching part MW. That is, in the case where the device is used with the side part in which the cutout part LW is formed at the lower end side, it is easy for the liquid entering from the region between the glass substrate and the upper frame (not shown) to concentrate on the region in which the cutout part LW is formed.

As a result, regardless of the entering location of the liquid entering from the region between the glass substrate and the upper frame (not shown), the entering liquid may be reliably moved to the cutout part LW, and the display defects due to the entering liquid may be further reduced in addition to the same advantage as that of the liquid crystal display device of embodiment 1, and the reliability of the liquid crystal display device may be further improved.

Figure 8A:
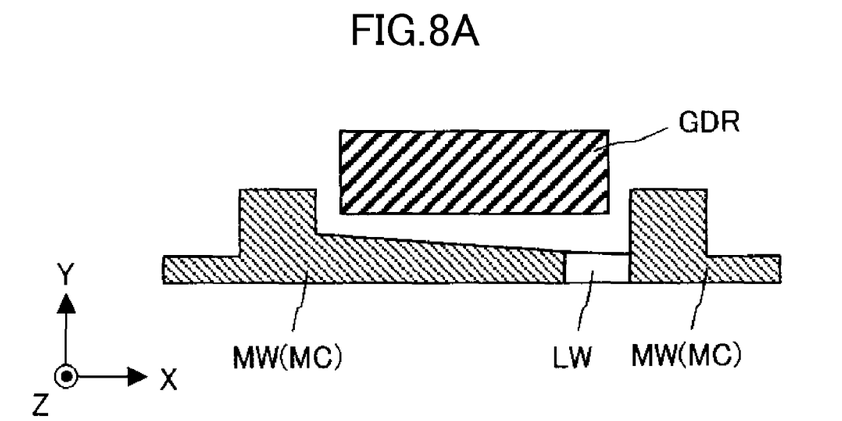
FIGS. 8A and 8B are plan views for explanation of schematic configurations of other mold members in the liquid crystal display device of embodiment 3 of the invention.

Note that, in the liquid crystal display device of embodiment 3, the configuration includes, but is not limited to, one cutout part LW formed in the nearly center part of the scan signal line driver circuit GDR in the X-direction. For example, as shown in FIG. 8A, one cutout part LW may be formed at the end part side of the scan signal line driver circuit GDR in the X-direction. In this case, when a liquid enters the left end part of the scan signal line driver circuit GDR in the drawing, the distance to the cutout part LW becomes larger. On the other hand, in the configuration of embodiment 3, the tapered inclination is formed with respect to the formation location of the cutout part LW in the inner peripheral surface of the catching part MW and the lowermost part of the inclination is the cutout part LW. Therefore, after the liquid entering from the part farthest from the cutout part LW reaches the catching part MW, the liquid may easily move to the cutout part LW along the tapered inclination formed on the inner peripheral surface of the catching part MW, and thus, the above described advantage may be obtained.

Figure 8B:
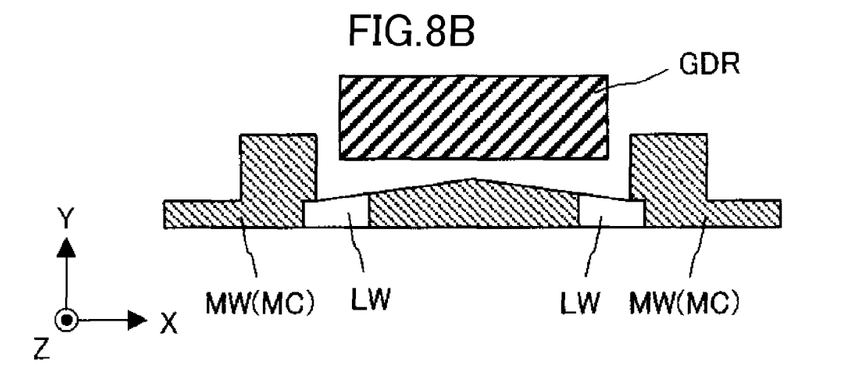

Further, as shown in FIG. 8B, the cutout parts LW may be respectively formed in the end parts of the scan signal line driver circuit GDR in the X-direction. In this regard, for example, the nearly center part of the scan signal line driver circuit GDR in the X-direction projects farthest toward the side of the scan signal line driver circuit GDR and the distance from the formation location of the cutout part LW to the scan signal line driver circuit GDR becomes the maximum. That is, the tapered inclinations from the nearly center part of the scan signal line driver circuit GDR in the X-direction toward the cutout parts LW on the right and left in the drawing are formed. As a result, even when the liquid enters from the nearly center part of the scan signal line driver circuit GDR in the X-direction as the farthest part from the two cutout parts LW, the liquid may easily move to the cutout parts LW along the inclinations formed on the inner wall surface of the catching part MW, and thus, the above described advantage may be obtained. Furthermore, in the configuration shown in FIG. 8B, for example, in the case where the respective cutout parts LW are formed in the same width in the X-direction as that of the cutout part LW shown in FIG. 8A, the capacity for holding the liquid may be increased, and a special advantage that the reliability of the liquid crystal display device may be further improved may be obtained.

Embodiment 4

Figure 9:
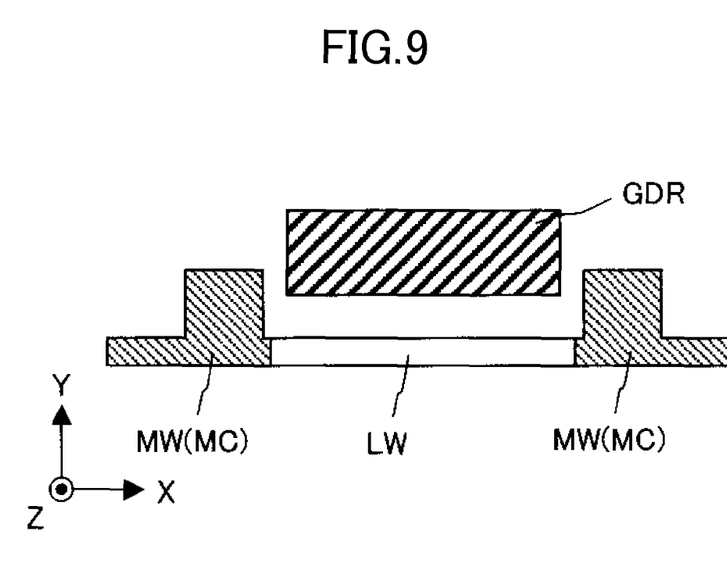
FIG. 9 is a plan view for explanation of a schematic configuration of a mold member in a liquid crystal display device as a display device of embodiment 4 of the invention.

FIG. 9 is a plan view for explanation of a schematic configuration of a mold member in a liquid crystal display device as a display device of embodiment 4 of the invention, and specifically an enlarged view of a catching part MW corresponding to one scan signal line driver circuit GDR. Note that, also, in the liquid crystal display device of embodiment 4, the other configuration than the shape of the inner peripheral surface of the catching part MW is the same as that of embodiment 1. Accordingly, in the following explanation, the shape of the inner peripheral surface of the catching part MW corresponding to one scan signal line driver circuit GDR will be explained in detail. Further, in embodiment 4, the case where the catching part MW of embodiment 4 is applied to the catching part MW of embodiment 1 will be explained, however, it may be applied to the catching part MW of embodiment 2, i.e., the shape of the inner peripheral surface of the first catching part MW1.

As shown in FIG. 9, in the mold member MC of embodiment 4, a cutout part LW corresponding to each scan signal line driver circuit GDR is formed to be larger than the width of the scan signal line driver circuit GDR in the X-direction. That is, in the configuration of embodiment 4, the catching part projecting toward the side of the upper frame (not shown) is not formed in the region where the scan signal line driver circuit GDR is formed. According to the configuration, in the liquid crystal display device of embodiment 4, regardless of the entering location of the liquid entering from the region between the glass substrate and the upper frame (not shown), the entering liquid may be reliably moved to the cutout part LW only with the movement in the Y-direction, but without the movement in the X-direction. As a result, in the liquid crystal display device of embodiment 4, the display defects due to the entering liquid may be further reduced in addition to the same advantage as that of the liquid crystal display device of embodiment 1, and the reliability of the liquid crystal display device may be further improved.

Note that, in the case where the configuration of embodiment 4 is applied to the catching part MW of embodiment 2, the catching part (second catching part) projecting toward the side on which the liquid crystal display panel PNL is mounted is also formed in the formation region of the cutout part LW. Therefore, the scan signal line driver circuit GDR may be supported by the second catching part MW2, and thus, the liquid crystal display panel PNL may be supported by the glass substrate (not shown) and the scan signal line driver circuit GDR and stress with the support may be prevented from being applied to a specific part of the liquid crystal display panel.

Note that, in the embodiments 1 to 4 of the invention, the case where the foremost surface of the display device is the polarizer has been explained, however, the embodiments may be applied to a configuration in which a touch sensor is provided on the foremost surface, for example, without limitation.

Further, in the embodiments 1 to 4 of the invention, the case where the driver circuits are formed on the three sides of the liquid crystal display device has been explained, however, the driver circuits may be formed on four sides without limitation.

Furthermore, in the embodiments 1 to 4 of the invention of the application, the cutout parts have been formed in side parts in which the scan signal line driver circuits are provided as driver circuits, however, in the case where the side part in which another driver circuit (for example, a video signal line driver circuit or the like) is provided is located at the lower end side when an image is displayed, the cutout part may also be formed in the side part.

So far, the invention achieved by the inventors has been specifically explained according to the embodiments of the invention, however, the invention is not limited to the embodiments, and various changes may be made without departing from the scope thereof.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A display device comprising:
   a display panel configured to display an image; and
   a frame body that has a lower frame, a mold member, and an upper frame and that protects to cover the display panel,
   wherein
   the upper frame has a box shape with one surface opened along a side wall surface and the other surface extending from a proximity of the side wall in an in-plane direction by a predetermined amount to form an opening part corresponding to a display area,
   the mold member is formed integrally with or separately from the lower frame member and includes a mounting part that mounts at least a peripheral part of the display panel and supports the display panel from a rear surface, and a catching part formed along a thickness direction of the display panel to project from the mounting part in the mounting direction of the display panel and formed in correspondence with an end surface of the display panel,
   the catching part of the mold member includes a first catching part having a top part opposite to the mounting part in contact with an inner surface of the upper frame, and a second catching part with a projection height from the mounting part lower than a projection height of the first catching part,
   the second catching part is formed at a lower part side of an image displayed on the display panel,
   the display panel has a transparent substrate on which pixels for modulating planar light radiated from the rear surface are arranged in a matrix form and driver circuit boards at least partially contacted to at least three edge lines of the transparent substrate,
   at least one edge line of the three edge lines to which the driver circuit boards are contacted is a bottom edge line of the display panel, the bottom edge line is an edge line close to a lower side of the image displayed on the display panel,
   the second catching part is formed at least in a bottom part of the mold member, the bottom part of the mold member is a part close to the lower side of the image displayed on the display panel,
   the one of the driver circuit boards at least partially contacting to the one edge line of the three edge lines extends from the one edge line to a bottom side of the display device in a direction parallel to the rear surface of the transparent substrate, the bottom side of the display device is a side close to the lower side of the display panel,
   the mold member has a recess part formed on an inner wall surface so as to accommodate the one of the driver circuit boards projecting from the transparent substrate,
   the second catching part is formed with respect to the recess part, and
   an inner wall surface of the catching part facing the display panel has a tapered inclination toward the second catching part.

2. The display device according to claim 1, wherein the projection height of the second catching part is zero.

3. The display device according to claim 1, wherein the second catching part is formed in a width equal to or less than that of the recess part formed on the inner wall surface.

4. The display device according to claim 1, wherein the display panel includes a pair of transparent substrates oppositely provided via a liquid crystal layer and a planar light source that is provided on a rear surface side of the pair of transparent substrates via the mold member and radiates planar light.

* * * * *